Feb. 2, 1932.  W. H. POESSE  1,843,628
MOTOR BEARING OILER
Filed Sept. 3, 1927

Inventor
Walter H. Poesse
By Bates, Macklin, Golrick & Teare
Attorneys

Patented Feb. 2, 1932

1,843,628

UNITED STATES PATENT OFFICE

WALTER H. POESSE, OF CLEVELAND, OHIO, ASSIGNOR TO THE DOMESTIC ELECTRIC COMPANY, OF CLEVELAND, OHIO, A CORPORATION OF OHIO

MOTOR BEARING OILER

Application filed September 3, 1927. Serial No. 217,458.

This invention relates to oiling systems, and particularly to a shaft bearing oiler for an electric motor.

The general object of the invention is to provide an oiler, the parts of which are so arranged that an adequate oil supply may be available to the shaft for a long period of time without refilling, and with which arrangement oil is effectively prevented from escaping along the shaft in such manner as to cause damage to adjacent parts.

A specific object is to provide an oiling device in connection with a vertical armature shaft, of an electric motor, by the use of which a considerable amount of lubricating oil may be retained and fed to the shaft at a uniform rate, and so arranged that no oil will be allowed to travel along the shaft to the commutator of the motor.

Further objects and features of the invention will become apparent from the following description relating to the accompanying drawings, wherein I have shown my preferred form. The essential characteristics are summarized in the claims.

Figure 1:
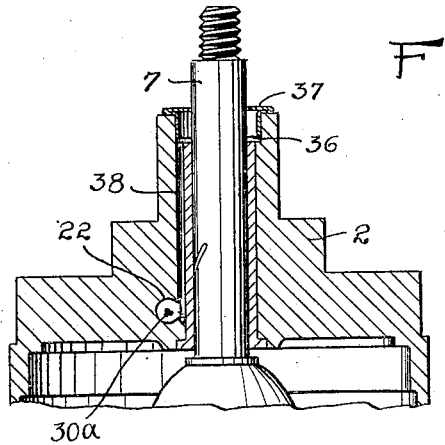
Figure 2:
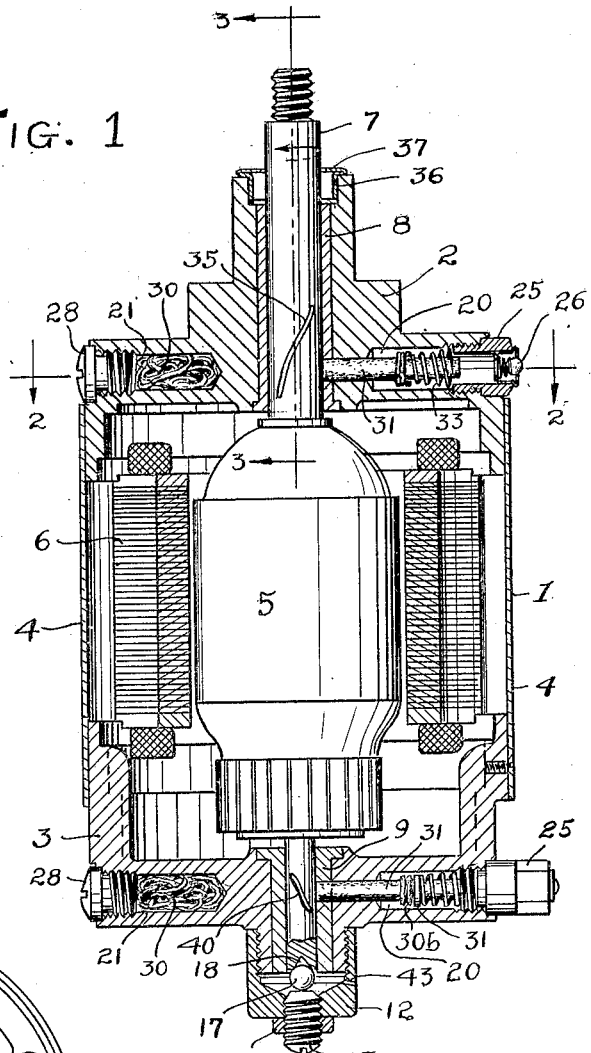
Figure 2:
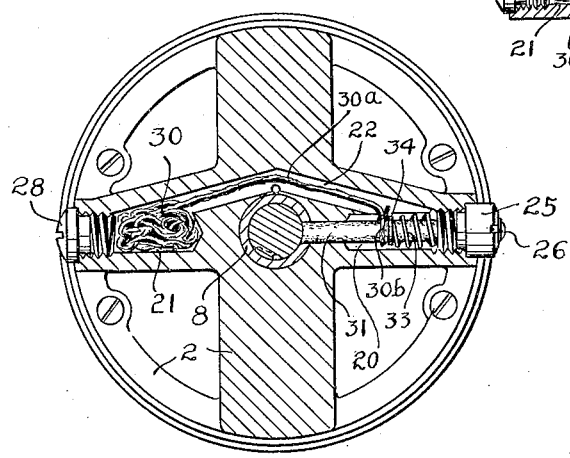

In the drawings, Fig. 1 is a substantially central cross sectional view through a motor casing and motor embodying my invention; Fig. 2 is a transverse cross sectional view taken along the line 2—2 in Fig. 1; and Fig. 3 is a fragmentary cross sectional view taken at right angles to Fig. 1, as indicated by the line 3—3 in Fig. 1.

The device comprises, exclusive of the motor casing and bearing parts, a reservoir at one side of the shaft, a gland for conducting oil directly to the shaft, a device in the reservoir for holding oil by capillary attraction, and a wick for conducting oil from the reservoir to the gland. The device consists further in the provision of an inclined channel or plurality of channels in the shaft adjacent the gland for directing oil supplied to the shaft in the desired direction, in this case, away from the armature of the motor. Further refinements will be hereinafter set forth.

Referring in detail to the drawings, 1 indicates the general motor housing or casing, comprising an upper section 2, preferably a casting, a lower section 3, also preferably a casting, and a dust-proof shell 4 bridging across both sections 2 and 3. The motor armature is indicated at 5, and the field at 6, the field, as shown, being of the usual construction, namely laminated sheet iron plates suitably held together and against which the members 2 and 3 are clamped, forming a rigid structure. The armature shaft 7 is laterally supported at its upper end in a bushing bearing 8 embedded in the member 2, and at its lower end in a bushing bearing 9 embedded in the member 3. The vertical support for the shaft consists, as shown, of a recessed nut 12 threaded onto a projection 13 of the member 3, the nut in turn supporting a threaded stud 15. The stud may be locked in adjusted position as by a jam nut 15a, and the upper face of the stud carries a ball 17, which in turn supports the lower end of the shaft 7. The lower end of the shaft is recessed at 18 for engaging the ball.

In Fig. 1, two of my oiling devices are shown, one for the upper end of the shaft, and one for the lower end. These are substantially similar but differently adapted to their respective positions. Referring particularly to the arrangement at the top of Fig. 1, the casing member 2 has oppositely disposed recesses 20 and 21 suitably closed at their outer ends and connected by a channel 22 extending outwardly and then inwardly to pass the shaft and bushing 8. The recess 21 is the main reservoir for oil, and the recess 20 contains the gland above mentioned for conducting oil directly to the shaft. The closure for the recess 20 comprises an oil duct 25 of known construction, including a spring pressed check valve 26, by reason of which oil may be forced into and retained in the reservoir through the recess 20 and channel 22. The end closure for the recess 21 may be simply a cap screw, such as 28. The inner end of the gland 31 extends through registering openings in the member 2 and the bushing 8 into contact with the shaft, and the outer end of the gland is embraced by a coil spring 33 for maintaining the contact. The spring rests at its inner end on a metal washer 34 held in place on the gland, and the outer end rests against the sleeve of the oil duct 25.

The provision for retaining a large supply of oil in the reservoir 21, irrespective of the position of the motor, consists primarily in placing a sufficient quantity of loose fibrous material in the reservoir so that when oil is fed to the reservoir the fibrous material will soak the oil up by capillary attraction and hold it against leaking out. The preferred arrangement is to wad up a single strand of cotton yarn, or the like, as at 30, and to pass one end of the strand through the channel 22, as at 30a, tying the end of the strand onto the gland 31, as at 30b. Preferably the strand is given several turns about the wick where it is tied on to thus hold the washer 34 in place.

It will be seen from the above that when the required amount of oil is forced through the sleeve 25 and along the channel 22, such oil will be absorbed by the fiber strand 30. In actual practice all the recesses are substantially filled by the initial charge of oil and then in a short time after filling, all the free oil (as in the recess 20) is soaked up and retained by the wadded strand, the wick portion thereof, and, of course, the gland 31. Thereafter for a surprisingly long period of time the wick feeds oil to the gland only as the oil from the gland is used up in lubricating the shaft.

It is important to keep oil from running down onto the armature from the upper bearings, mainly because if enough oil does this, it will finally get to the commutator and cause fouling at the brush contacting surfaces. Hence, at the upper bearing, I have provided means for forcing oil upwardly along the shaft. This as shown comprises a spiral groove 35 in the shaft opposite the gland 31. Assuming that the shaft always rotates in the direction of the arrow, the action of the groove will be to force oil upwardly along the shaft. If there is an excess of oil in the reservoir, causing the gland 31 to feed too much oil to the bearing surfaces, then this excess will be simply forced upwardly along the shaft into a reservoir formed by a recess 36 at the top of the member 2. The recess as shown is capped by an annular plug 37 surrounding the shaft to prevent the entrance of dust and the like. From this reservoir the oil may run down outside of the bushing 8 through a channel 38, Fig. 3, which communicates at its lower end with the channel 22. The ultimate result of this arrangement is that even though too much oil is forced into the various recesses and channels 20—21—22, there will result simply a circulation of oil up along the shaft into the reservoir 36 and down again into the channel 22, but practically no oil will leak down between the shaft and bushing 8 onto the armature.

The oiling device associated with the lower end of the shaft is substantially similar to that at the upper end, and the parts corresponding to the upper oiler are correspondingly numbered. The essential difference between the two oilers is that in place of the right hand spiral groove 35 at the upper end of the shaft a left hand spiral 40 is provided, in the same position relative to the gland 31 as before. By this arrangement and assuming the same direction of rotation, oil fed to the shaft by the gland is forced downwardly along the shaft instead of upwardly. It is obvious that the same sort of oil return may be provided in connection with the lower oiler as with the upper, namely by reason of a reservoir and return channel. However, since, the usual condition does not result in an excess feeding of oil, and since it is desirable that the channels be drained of free oil, I simply make provision to allow any excess oil fed downwardly along the shaft from the gland 31 of the lower oiler to run out at a small vent hole placed as shown at 43 in the threaded member 12.

From the above description, it will be seen that I have provided a very simple and convenient oiling arrangement which will operate to supply oil for sufficient lubrication of a shaft, but which will not flood irrespective of the position of the shaft, and which will supply oil for a very great length of time without attention. While I have shown the device in connection with a motor, and have pointed out in detail the specific purpose for which I choose to employ it, it is to be understood that any analogous use may be made of my invention without departing from the intended scope of this patent.

I claim:

1. In an electric motor adapted to stand in substantially upright position, a casing, an armature and a shaft supported by the casing, a bearing for the upper end of the shaft, a reservoir associated with said bearing, a gland lying in a horizontal plane extending into contact with the shaft, a restricted channel in the casing leading from the reservoir to the gland, capillary means in the reservoir having a portion thereof extending through the channel and connected with the gland, means for forcing excess lubricant fed by said gland upwardly along the shaft when the shaft is rotated in a given direction, and means including a recess disposed at the top of the bearing for conducting lubricant so fed downwardly and again into the reservoir.

2. In combination with an electric motor having a shaft and armature in upright position, a casing, bearings for the shaft carried by the casing above and below the armature, reservoirs in the casing associated with each of the bearings, gland means lying in a horizontal plane and including a restricted channel in the casing, a fibrous member leading therethrough and a gland to which said fibrous member is attached, for conducting lubricant from said reservoirs to the shaft, and means active consequent upon rotation of the shaft in a given direction for forcing lubricant along the shaft from the upper gland means in an upward direction and means for forcing lubricant along the shaft from the lower gland means in a downward direction.

3. The combination with an electric motor having a shaft and armature in upright position, a casing, bearings for the shaft carried by the casing above and below the armature, reservoirs in the casing associated with each of the bearings, gland means lying in a horizontal plane and including a restricted channel in the casing, a fibrous member leading therethrough and a gland to which said fibrous member is attached, for conducting lubricant from said reservoirs to the shaft, and means active consequent upon rotation of the shaft in a given direction for forcing lubricant along the shaft from the upper gland in an upward direction, means for forcing lubricant along the shaft from the lower gland means in a downward direction, means for supporting the lower end of the shaft and means associated with said supporting means to relieve the pressure of the lubricant.

In testimony whereof, I hereunto affix my signature.

WALTER H. POESSE.